United States Patent
Sekine

(10) Patent No.: US 12,511,091 B2
(45) Date of Patent: Dec. 30, 2025

(54) MEETING ASSISTANCE SYSTEM

(71) Applicant: INTERACTIVE SOLUTIONS CORP., Tokyo (JP)

(72) Inventor: Kiyoshi Sekine, Tokyo (JP)

(73) Assignee: Interactive Solutions Corp., Tokyo (JP)

( * ) Notice: Subject to any disclaimer, the term of this patent is extended or adjusted under 35 U.S.C. 154(b) by 0 days.

(21) Appl. No.: 18/013,907

(22) PCT Filed: Nov. 19, 2021

(86) PCT No.: PCT/JP2021/042622
§ 371 (c)(1),
(2) Date: Dec. 30, 2022

(87) PCT Pub. No.: WO2022/107884
PCT Pub. Date: May 27, 2022

(65) Prior Publication Data
US 2024/0036801 A1     Feb. 1, 2024

(30) Foreign Application Priority Data
Nov. 20, 2020  (JP) ................. 2020-193894

(51) Int. Cl.
*G06F 3/14*     (2006.01)
*H04L 65/1089*  (2022.01)

(52) U.S. Cl.
CPC ........ *G06F 3/1454* (2013.01); *H04L 65/1089* (2013.01)

(58) Field of Classification Search
CPC ............................ G06F 3/1454; H04L 65/1089
See application file for complete search history.

(56) References Cited

U.S. PATENT DOCUMENTS

| | | | |
|---|---|---|---|
| 10,013,137 B2 * | 7/2018 | Nancke-Krogh | G06F 9/4843 |
| 11,126,320 B1 * | 9/2021 | Thompson | G06F 3/0482 |

(Continued)

FOREIGN PATENT DOCUMENTS

| | | |
|---|---|---|
| JP | 2003-308284 A | 10/2003 |
| JP | 2006-178784 A | 7/2006 |

(Continued)

OTHER PUBLICATIONS

International Search Report of International Patent Application No. PCT/JP2021/042622 completed on Dec. 13, 2021 and mailed Dec. 21, 2021 (2 pages).

(Continued)

*Primary Examiner* — James T Tsai
(74) *Attorney, Agent, or Firm* — Pyprus Pte Ltd; George Liu

(57) ABSTRACT

[Problem] To provide a meeting assistance system capable of imparting bidirectionality and a sense of unity to a meeting. [Solution] A meeting assistance system includes: a presentation document storage unit 3 that stores a presentation document; an authority, imparting unit 5 that grants document manipulation rights to a participant; a document sharing unit 7 for sharing the presentation document with participants; and a presentation document updating unit 9 that, on the basis of a manipulation from one or more authorized participants to which document manipulation rights have been granted, manipulates and updates the presentation document stored in the presentation document storage unit 3. When the document sharing unit 7 is sharing a first presentation document with a plurality of participants, if one or more authorized participants manipulates the first presentation document, the updated first presentation document shared in real time with the plurality of participants.

4 Claims, 6 Drawing Sheets

(56) References Cited

U.S. PATENT DOCUMENTS

| | | | |
|---|---|---|---|
| 11,176,207 B2* | 11/2021 | Rho | G06F 16/9038 |
| 2016/0149843 A1* | 5/2016 | Spicer | G06Q 10/101 |
| | | | 709/206 |
| 2019/0108578 A1* | 4/2019 | Spivack | G09B 5/065 |
| 2020/0202634 A1* | 6/2020 | Faulkner | G06F 21/604 |
| 2022/0101593 A1* | 3/2022 | Rockel | G06F 3/017 |
| 2022/0108276 A1* | 4/2022 | Stringham | G06F 3/04817 |

FOREIGN PATENT DOCUMENTS

| | | | |
|---|---|---|---|
| JP | 4171123 B2 | 10/2008 | |
| JP | 2009-93456 A | 4/2009 | |
| JP | 2010-108261 A | 5/2010 | |
| JP | 2012-194625 A | 10/2012 | |
| JP | 2013-65125 A | 4/2013 | |
| JP | 2014-7723 A | 1/2014 | |
| JP | 2014-56546 A | 3/2014 | |
| JP | 2016-66253 A | 4/2016 | |
| JP | 2020-144477 A | 9/2020 | |

OTHER PUBLICATIONS

Written Opinion of International Patent Application No. PCT/JP2021/042622 completed on Dec. 13, 2021 and mailed Dec. 21, 2021 (3 pages).

Toshiaki Tanaka et al., Colleague : Joint Editing System Based on Structured Multimedia Document, Jun. 15, 1995, vol. 36, No. 6, pp. 1310-1321.

Nikkei Personal Computing, Comparing Web Office Services; What Are Benefits of Online Office Services on the Web?, Nov. 8, 2010, vol. 613, pp. 36-43.

Convenient function of "Lark" which supports the video conferencing in business [on-line], Aug. 24, 2020, [date-of-search:Dec. 23, 2021] Internet:<URL: https://news.mynavi.jp/techplus/kikaku/lark_suite-6/>.

Collaboration function of "Lark" which can share a file on-line [on-line], Sep. 18, 2020, [date-of-search:Dec. 23, 2021] Internet:<URL: https://news.mynavi.jp/techplus/kikaku/lark_suite-7/>.

* cited by examiner

[Fig. 1]
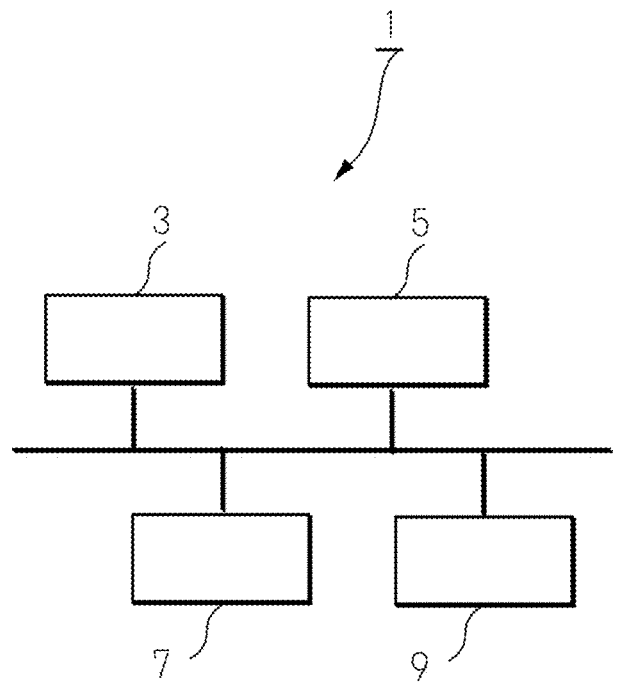
[Fig. 2]
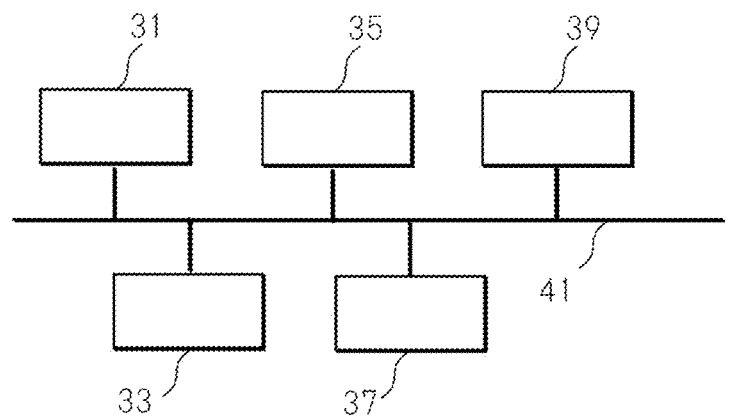

[Fig. 3]
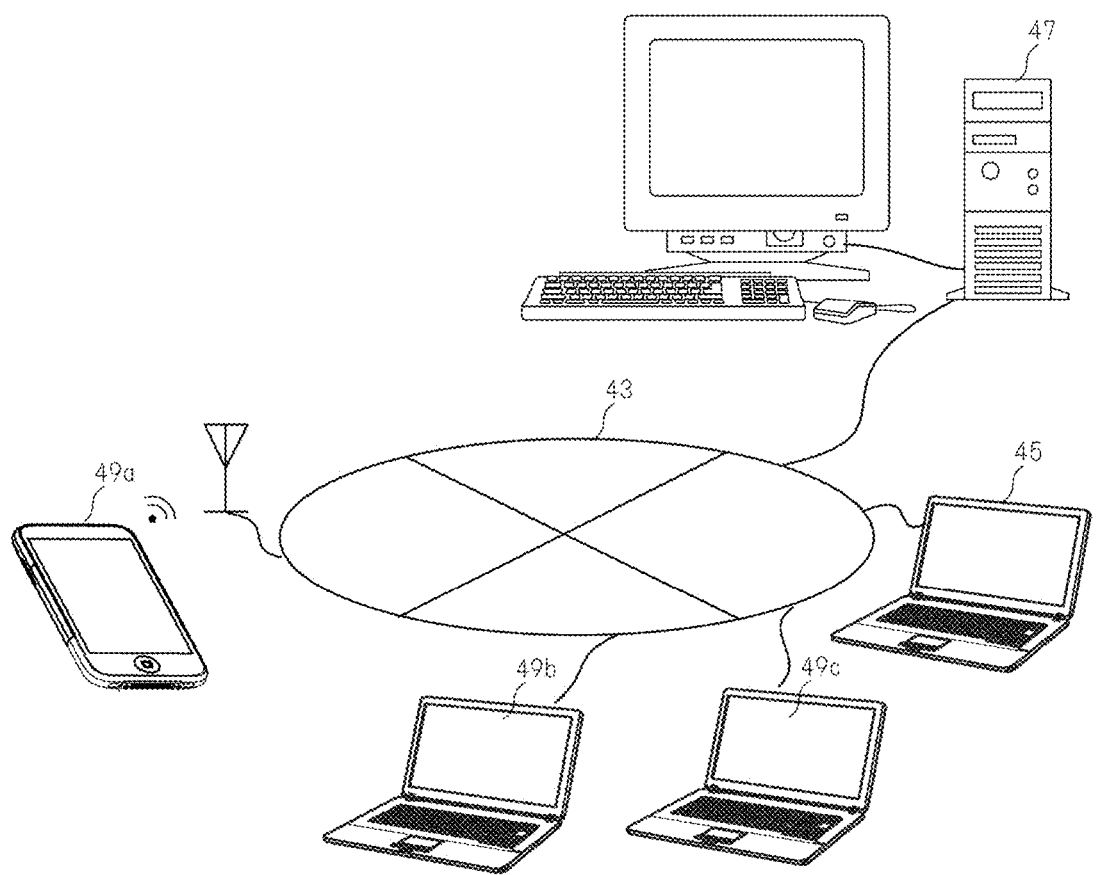

[Fig. 4]
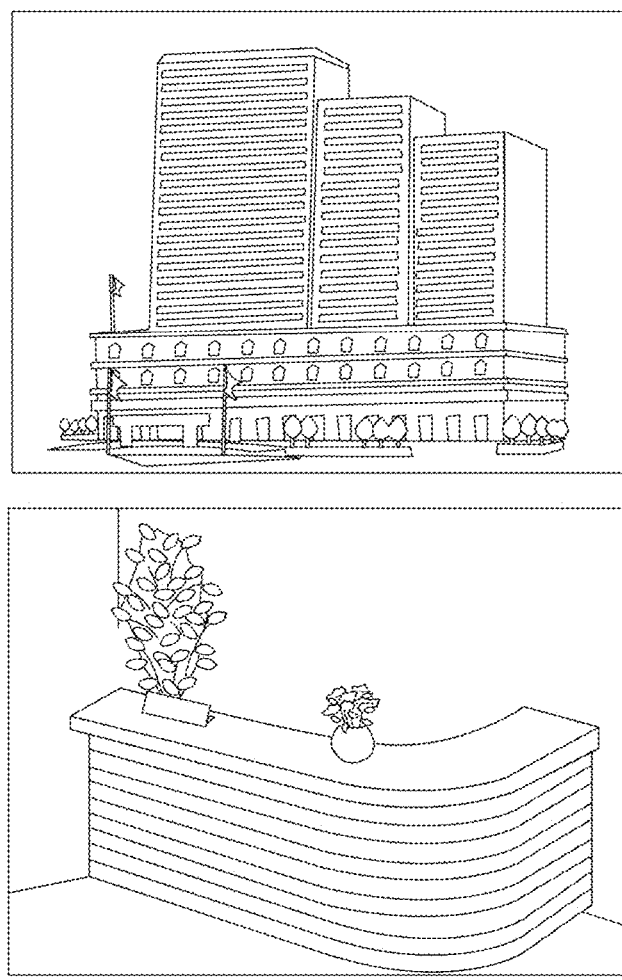

[Fig. 5]
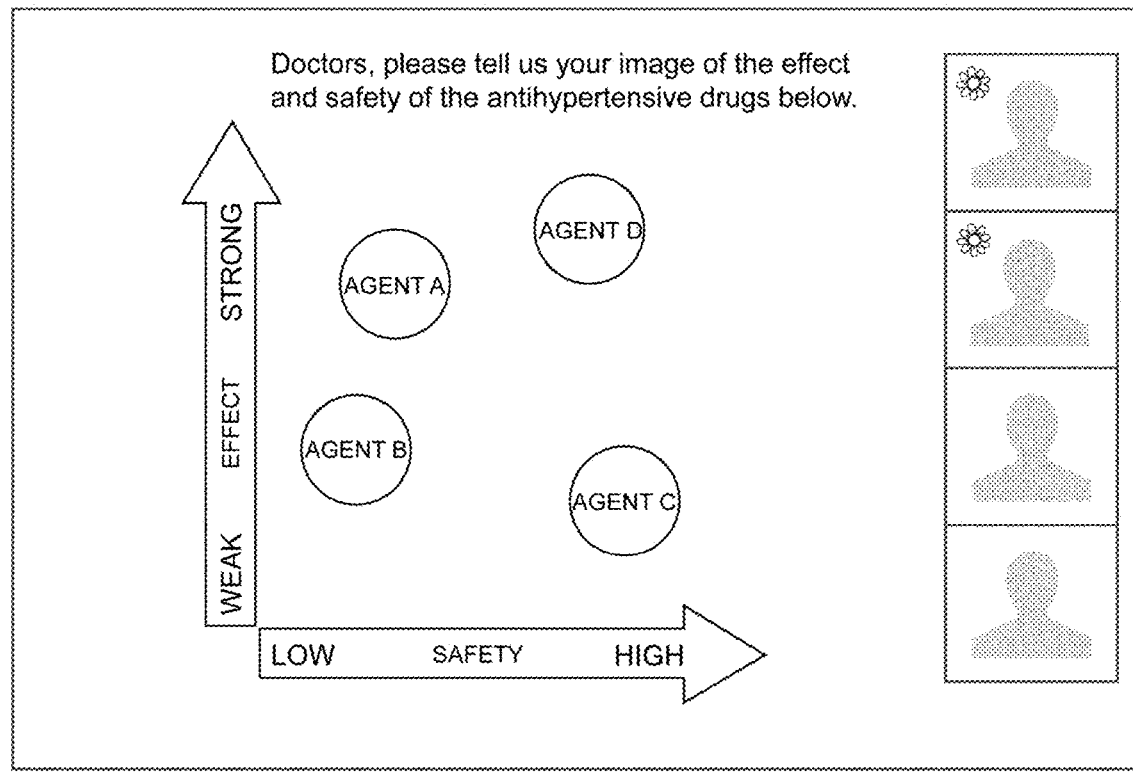

[Fig. 6]
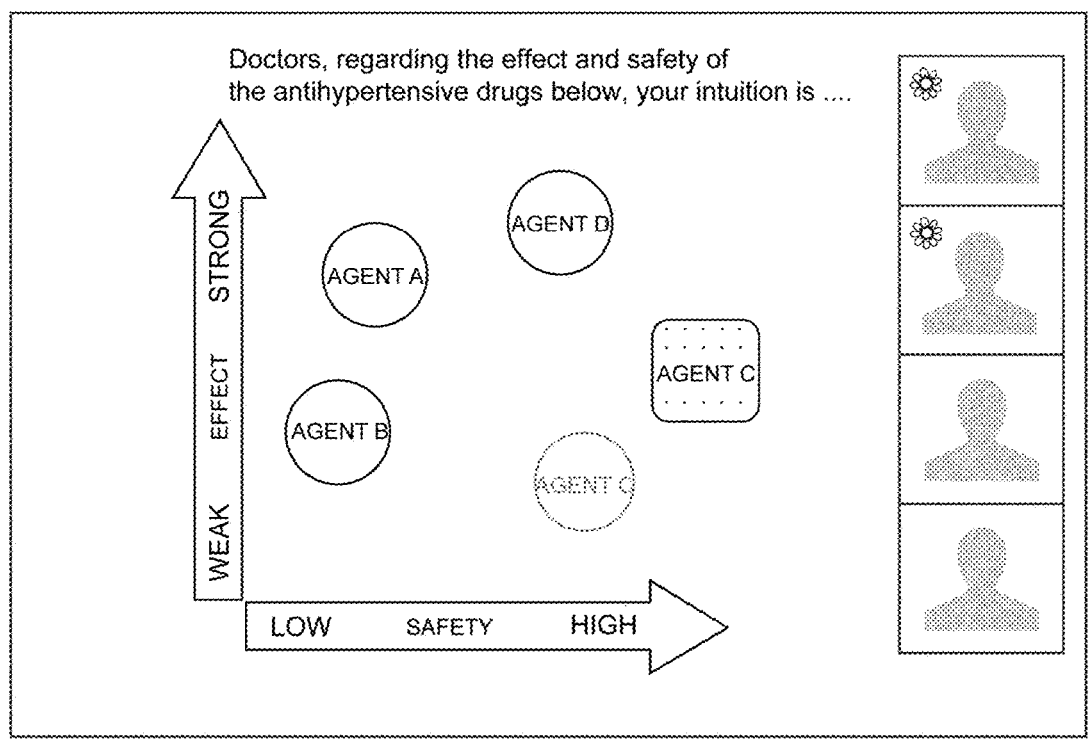

[Fig.7]
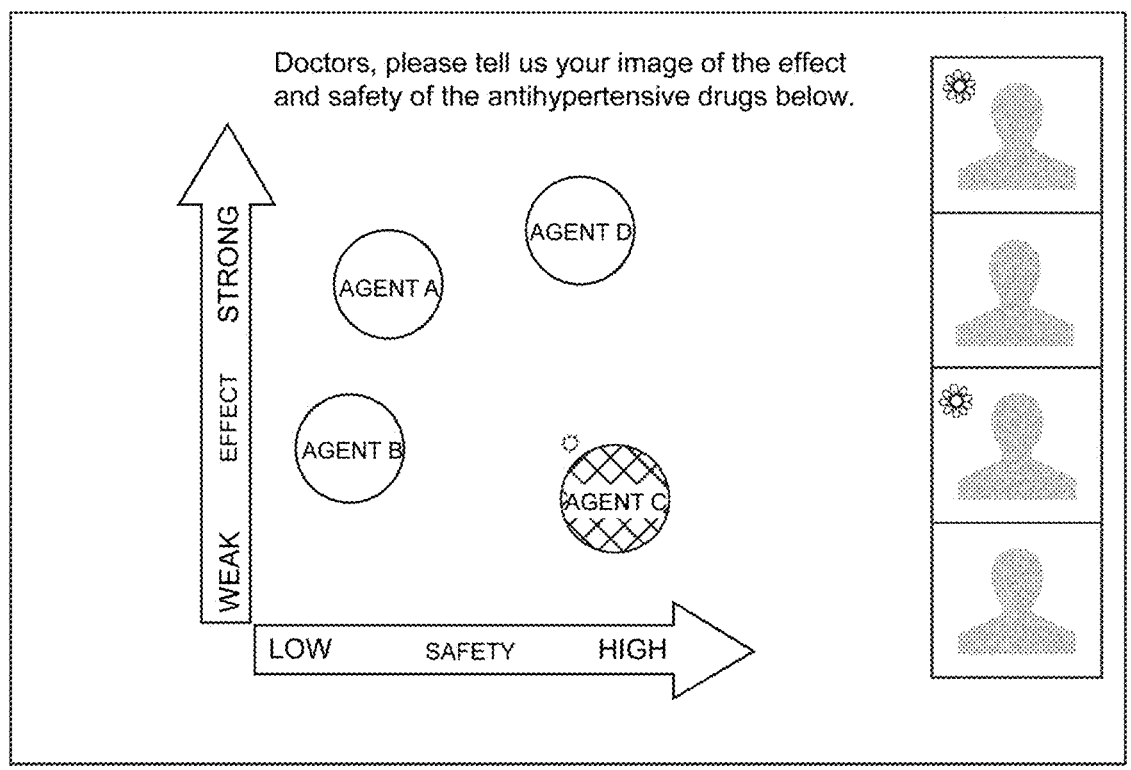

MEETING ASSISTANCE SYSTEM

TECHNICAL FIELD

This invention relates to a meeting assistance system. More specifically, this invention relates to a meeting assistance system that allows participants to simultaneously operate a presentation document.

BACKGROUND ART

JP-A-2020-144477 discloses a communication terminal that allows confirming results generated in a group conference after the group conference ends. Such system that allows confirming results generated in a group conference after the group conference ends exists. However, a presentation document cannot be operated by a plurality of participants. Therefore, a conventional meeting assistance system lacks bidirectionality and has a poor sense of unity.
Patent Document 1: JP-A-2020-144477

DISCLOSURE OF THE INVENTION

Problems to be Solved by the Invention

An object of this invention is to provide a meeting assistance system capable of imparting bidirectionality and a sense of unity to a meeting.

Solutions to the Problems

The above-described object allows a plurality of participants to operate a presentation document and share the operated presentation document in real time.

This invention relates to a meeting assistance system 1.

The meeting assistance system 1 includes a presentation document storage unit 3, an authority imparting unit 5, a document sharing unit 7, and a presentation document updating unit 9.

The presentation document storage unit 3 is an element for storing a presentation document.

The authority imparting unit 5 is an element for granting a document operation right to a participant.

The document sharing unit 7 is an element for sharing the presentation document with a participant.

The presentation document updating unit 9 is an element for operating and updating the presentation document stored in the presentation document storage unit 3 based on operations from one or a plurality of right-holding participants to which a document operation right has been granted by the authority imparting unit 5.

Further, in the meeting assistance system 1, in a case where the document sharing unit 7 is sharing a first presentation document with a plurality of participants, when the one or plurality of right-holding participants operate the first presentation document, the updated first presentation document is shared in real time with the plurality of participants.

In a preferred example of the meeting assistance system 1, the presentation document storage unit 3 exists on a web server. In this case, the presentation document updating unit 9 is preferred to operate and update the presentation document stored in the presentation document storage unit 3 based on, not only the operations from the one or a plurality of right-holding participants, but also an operation from a speaker.

In another preferred example of the meeting assistance system 1 besides the one described above, the presentation document storage unit 3 exists on a speaker's computer. Further, the presentation document updating unit 9 operates and updates the presentation document stored in the presentation document storage unit 3 based on, not only the operation from the one or a plurality of right-holding participants, but also the operation from the speaker.

Advantageous Effects of the Invention

This invention allows a plurality of participants to operate a presentation document and the operated presentation document to be shared in real time. As a result, this invention can provide a meeting assistance system capable of imparting bidirectionality and a sense of unity to a meeting.

BRIEF DESCRIPTION OF THE DRAWINGS

FIG. 1 is a block diagram for describing a search document information storage device of the present invention.

FIG. 2 is a block diagram illustrating a basic configuration of a computer.

FIG. 3 is a conceptual diagram illustrating an example of the system of the present invention.

FIG. 4 is a conceptual diagram illustrating an example of a virtual space to which a participant is guided before a meeting starts.

FIG. 5 is a conceptual diagram illustrating an example of a presentation document being shared.

FIG. 6 is a conceptual diagram illustrating a state in which a plurality of participants are simultaneously operating a presentation document.

FIG. 7 is a conceptual diagram illustrating a state in which a plurality of participants are simultaneously operating a certain content in a presentation document.

DESCRIPTION OF PREFERRED EMBODIMENTS

The following describes embodiments for performing the present invention using the drawings. The present invention is not limited to the embodiments described below, but includes modifications from the following embodiments appropriately made by those skilled in the art within the obvious scope.

FIG. 1 is a block diagram for describing a search document information storage device of the present invention. This device is a processing device implemented by a computer. The computer may be any of a mobile terminal, a desktop type personal computer, and a server, or a combination of two or more thereof. These are usually connected so as to be able to transmit and receive information via the Internet (intranet) or the like. A plurality of computers may be used to share functions, for example, by allowing any of the computers to have a part of the functions.

As shown in FIG. 1, the meeting assistance system 1 includes a presentation document storage unit 3, an authority imparting unit 5, a document sharing unit 7, and a presentation document updating unit 9. The meeting assistance system 1 relates to a system for assisting a gathering through monitors using electronic devices (instead of directly face-to-face), such as an online meeting (conference), an online presentation, an online lecture, or an online assembly. The system 1 can be implemented by, for example, installing a program to each server and/or terminal.

FIG. 2 is a block diagram illustrating a basic configuration of the computer. As illustrated in this drawing, the computer has an input unit 31, an output unit 33, a control unit 35, a calculation unit 37, and a storage unit 39, and each element is connected by, for example, a bus 41 so as to be able to transmit and receive information. For example, in the storage unit, a control program may be stored, or various information may be stored. When predetermined information is input from the input unit, the control unit reads out the control program stored in the storage unit. Then, the control unit reads out the information stored appropriately in the storage unit and transmits it to the calculation unit. Further, the control unit transmits the information input appropriately to the calculation unit. The calculation unit conducts a computation process using the received various information, and stores the resultant in the storage unit. The control unit reads out the result of the computation stored in the storage unit and outputs it from the output unit. Various processes are thus conducted. These various processes are executed by the respective means.

FIG. 3 is a conceptual diagram illustrating an example of the system of the present invention. As illustrated in FIG. 3, the system of the present invention (the system including a device of the present invention) may be one including a terminal for speaker 45 (first terminal) connected to the Internet or an intranet 43 and a server 47 connected to the Internet or intranet 43. Surely, a single computer or mobile terminal may function as the device of the present invention, or a plurality of servers may exist. Further, this system may be one that includes a plurality of terminals for participants 49a, 49b, 49c that are connected to the Internet or intranet 43.

The presentation document storage unit 3 is an element for storing the presentation document. The storage unit functions as the presentation document storage unit 3. An example of the presentation document is a document created with PowerPoint (registered trademark) or pdf (registered trademark). The presentation document means, for example, a whole (one file) of a sequence of documents created by software, such as PowerPoint (registered trademark) or means a specific page. For example, an identification number or ID may be assigned to each presentation document.

The authority imparting unit 5 is an element for granting a document operation right to a participant. The document operation right may be set for each meeting, or may be set by a speaker at a meeting. Further, the presentation document storage unit 3 may store information of a participant who is granted the right. For example, the speaker performs input for granting the document operation right to a participant during a meeting. Accordingly, the speaker's terminal receives the input for granting the document operation right to the participant. Subsequently, the system stores the fact regarding the participant who has been granted the document operation right that the participant has the document operation right in the storage unit. Accordingly, the participant who has been granted the document operation right (similarly to the speaker) is able to operate the meeting document during the meeting. The document operation right may be granted to a plurality of participants.

The document sharing unit 7 is an element for sharing the presentation document with the participants. "Sharing the presentation document with the participants" means that the speaker's terminal allows the presentation document displayed as a shared document on the speaker's terminal to be displayed on the display units of the participants' terminals that are connected to the speaker's terminal. For example, the document sharing unit 7 outputs the presentation document displayed as a shared document on the speaker's terminal to the terminals of respective participants as information to be displayed on the respective display units. Accordingly, the terminals of the respective participants that have received the information display the presentation document on the respective display units. Thus, the presentation document can be shared with the participants.

The presentation document updating unit 9 is an element for operating and updating the presentation document stored in the presentation document storage unit 3 based on operations from one or a plurality of right-holding participants to which the document operation right has been granted by the authority imparting unit 5. In a case where a terminal of a right-holding participant that has the document operation right operates the presentation document displayed on its own display unit, the operation information is output from the terminal of the right-holding participant having the document operation right. Subsequently, the system that has received the operation information operates the presentation document stored in the presentation document storage unit 3 according to the operation information. Examples of the operation include, turning the presentation document to the next page (the previous page), changing the text, changing the size of the text, changing the color of the text, moving the position of the content (such as a point on a graph), changing the color of the content, playing a video, adding content, and adding text. Accordingly, the presentation document stored in the presentation document storage unit 3 is updated. In a case where two or more operations that do not interfere with one another are output to one presentation document, all the operations are reflected on the presentation document.

Further, in the meeting assistance system 1, in a case where the document sharing unit 7 shares the first presentation document with a plurality of participants, when one or a plurality of right-holding participants operate the first presentation document, the updated first presentation document is shared in real time with the plurality of participants.

An exemplary implementation of the meeting assistance system 1 will be described below.

Acquisition of Meeting Information

An organizer starts up the application of the meeting assistance system 1 and acquires a meeting guide. The meeting guide may include any of a conference URL (link destination), a conference ID, and a password for the conference. In addition, the organizer (terminal thereof) may store a presentation document in the storage area of the server related to the link destination. Accordingly, a part of the storage area of the server related to the URL functions as the presentation document storage unit 3. In addition, the organizer may specify a predetermined folder in one's own terminal and set the folder to function as the presentation document storage unit 3. The meeting information acquired by the organizer is distributed to the meeting participants.

The organizer may perform setting so as to grant the document operation right to a particular participant. The authority imparting unit 5 of the organizer's terminal or a server connected to the terminal, in relation to the identification information of the participant (such as an ID or an e-mail address), grants the document operation right. Accordingly, the storage unit stores the document operation right in relation to the identification information of the participant. Thus, the document operation right may be granted to a predetermined participant before the meeting. Surely, as describe later, the document operation right may be granted to a predetermined participant after the meeting has started.

Start of Meeting

The participant (terminal thereof) starts the meeting based on the received meeting information. Here, the participant may access the received URL or may input the meeting information to a predetermined site. Accordingly, the participant is able to participate in the meeting. Here, the participant may be guided to a virtual waiting room before the meeting starts.

FIG. 4 is a conceptual diagram illustrating an example of a virtual space to which the participant is guided before the meeting starts. In this example, an image of a building shown in the upper portion of FIG. 4 is output to the participant's terminal from the system, and the display unit of the participant displays the received image of the building. Here, the building may be displayed with information indicative of the organizer's affiliation (such as a company name), and an advertising image may be able to be displayed together with this image. Next, in this example, an image of a reception shown in the lower portion of FIG. 4 is output to the participant's terminal from the system, and the display unit of the participant displays the received reception image. Thus, the image before the meeting transmitted to the participant's terminal may be stored in the storage unit of the system and be preliminarily selected by the organizer to be output to the participant's terminal. In addition, an additional image, such as an advertising image, may be stored in the server guided by the application side, and the additional image may be output to the participant's terminal. The information to be transmitted may include music data or video data besides images. For example, a sponsoring company name or a product name besides information of the organizer or a meeting title may be displayed in the background part of the reception. By being guided into such waiting room, the participant can enjoy a realistic sensation as if actually participating in the meeting. The virtual waiting room may be, for example, a reception inside a company, a reception room, or a virtual trip. Such vision of the virtual waiting room is stored in the storage unit of the server. Subsequently, visual information of the waiting room is output to a terminal of a participant who has started participating. The terminal of the participant that has received the visual information of the waiting room outputs the vision of the virtual waiting room on its own display unit.

The organizer (terminal thereof) permits participation of the participant. Accordingly, the participant is invited into a virtual space for the meeting. The system stores a vision of the virtual space for the meeting in the storage unit. Accordingly, the system outputs the vision of the virtual space for the meeting to the participant's terminal. The participant's terminal receives the vision of the virtual space for the meeting and displays it on the display unit. Thus, the vision of the virtual space for the meeting is displayed on the participant's terminal. Similarly, when a plurality of participants participate, the vision of the virtual space for the meeting is displayed on the display unit of each participant's terminal.

The organizer or the participant inputs shared information for sharing a document in the meeting to the system. Accordingly, the document sharing unit 7 of the system reads out the specified presentation document from the presentation document storage unit 3 and outputs it to each participant's terminal. Accordingly, the display units of the respective participants' terminal display the received presentation document on their respective display units. Thus, the presentation document is shared with each participant.

FIG. 5 is a conceptual diagram illustrating an example of a presentation document being shared. In this example, the presentation document is displayed on a display unit of a certain terminal. In addition, in this example, there are four participants besides oneself. The states of the four participants are displayed on the right side of FIG. 5. The upper two people among the four participants are right-holding participants that are granted the document operation right. Note that, in this example, the display unit is controlled by the speaker (organizer), who is in a state where the presentation document displayed on the display unit of his/her own terminal can be shared with every participant by performing a shared setting of the presentation document.

FIG. 6 is a conceptual diagram illustrating a state where a plurality of participants are simultaneously operating a presentation document. In this example, the participant positioned in the top right row in FIG. 5 is correcting the title (text information). Here, the title part (a whole area including the text information) is locked for correction and the other right-holding participants are in a state where they cannot operate until the corrector finishes the correction operation. Further, in this example, the participant positioned in the second place performs operations of changing the position of the image content indicating agent C, and changing the image content to new image content. For example, in a case where the presentation document storage unit exists in the storage unit of the speaker's (organizer's) terminal (such as when a particular file including the presentation document is specified), the operation information of the presentation document is output from the participant's terminal toward the speaker's (organizer's) terminal. Subsequently, the terminal of the speaker (organizer) that has received the operation information updates the presentation document stored in the presentation document storage unit in real time. The updated presentation document is output in real time to the terminal of each participant. Accordingly, each terminal of the participants can display the updated presentation document in real time. This process is similar to a case where the presentation document storage unit exists on a particular server.

FIG. 7 is a conceptual diagram illustrating a state where a plurality of participants simultaneously operate a certain content in a presentation document. In this example, the speaker (organizer) outputs a command to take away the document operation right from the participant positioned in the second place, and the system deletes the document operation right stored in relation to the participant. On the other hand, in this example, the speaker (organizer) granted the document operation right to the participant positioned in the third place. Thus, right-holding participants may be changed during the meeting. In this example, for example, an evaluation of agent C became a topic. Therefore, the speaker (organizer) and the two right-holding participants tried to move the image content indicative of agent C. Accordingly, in the example of FIG. 7, so as to indicate that a plurality of people are trying to move the image content, the color of the content has changed. In this case, for example, a state after the image content has been changed as assumed by each of the speaker and the participants may be provisionally displayed, and the state may be displayed in real time to the participants. The process here may refer to the above description. In such case, it is possible to listen to opinions of a plurality of participants during the meeting while displaying respective changes. Accordingly, it becomes possible to provide bidirectionality to the meeting.

INDUSTRIAL APPLICABILITY

This invention can be used in the information and communication industry.

DESCRIPTION OF REFERENCE SIGNS

1 . . . meeting assistance system
3 . . . presentation document storage unit

5 . . . authority imparting unit
7 . . . document sharing unit
9 . . . presentation document updating unit

The invention claimed is:

1. A meeting assistance system, which comprises a computer comprising a processor and a program, wherein when executed on the processor, the program makes the computer to execute the program, comprising:
   a presentation document storage unit (3) that stores a presentation document;
   an authority imparting unit (5) that grants a document operation right to a participant;
   a document sharing unit (7) for sharing the presentation document with a participant; and
   a presentation document updating unit (9) that operates and updates the presentation document stored in the presentation document storage unit (3) based on an operation from a plurality of right-holding participants to which a document operation right has been granted by the authority imparting unit (5), wherein
   the document sharing unit has instructions to cause in a case where the document sharing unit (7) is sharing a certain presentation document stored in the presentation document storage unit (3) with a plurality of participants, wherein when the plurality of right-holding participants operate the certain presentation document, the updated certain presentation document is shared in real time with the plurality of participants,
   for a certain image content as a content included in the certain presentation document, in a case where the meeting assistance system concurrently receives commands to move the certain image content from two or more right-holding participants the presentation document updating unit (9) changes color of the certain image content, and updates the certain presentation document,
   wherein the certain image content with changed color is shared in real time with the right-holding participants,
   the document sharing unit has instructions to cause in a case where the meeting assistance system concurrently receives the commands to move the certain image content from the two or more right-holding participants, corresponding and respective assumed images of the certain image contents reflecting the concurrently received commands are simultaneously shared and displayed to the plurality of participants,
   and the presentation document storage unit (3) exists on a web server.

2. The meeting assistance system according to claim 1, wherein when commands from one of the participants to correct title in the presentation document are issued, the title is locked for correction.

3. A computer-implemented method for assisting a computer implemented meeting, comprising executing on a processor the steps of:
   storing a presentation document;
   granting a document operation right to a participant or participants of the meeting;
   sharing the presentation document with the participants;
   operating and updating the presentation document based on an operation from a plurality of right-holding participants to which a document operation right has been granted,
   wherein, when a certain presentation document is shared with a plurality of participants and the plurality of right-holding participants operate the certain presentation document, the updated certain presentation document being shared in real time with the plurality of participants, and
   for a certain image content as a content included in the certain presentation document, when commands to move the certain image content from two or more right-holding participants are concurrently issued, changing color of the certain image content and updating the certain presentation document,
   wherein the certain image content with changed color is shared in real time with the right-holding participants,
   in a case where the meeting assistance system concurrently receives the commands to move the certain image content from the two or more right-holding participants, corresponding and respective assumed images of the certain image contents reflecting the concurrently received commands are simultaneously shared and displayed to the plurality of participants.

4. The computer-implemented method according to claim 3, wherein the method further executes on the processor the step of locking title in the presentation document for correction when commands from one of the participants to correct the title are issued.

* * * * *